(12) United States Patent
Meier et al.

(10) Patent No.: US 7,845,040 B2
(45) Date of Patent: Dec. 7, 2010

(54) DEVICE AND METHOD FOR MECHANICAL CLEANING OF GROOVES

(75) Inventors: Walter Meier, Waltenshwil (CH); Ralph Studer, Seon (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 12/464,550

(22) Filed: May 12, 2009

(65) Prior Publication Data

US 2009/0235479 A1 Sep. 24, 2009

Related U.S. Application Data

(62) Division of application No. 11/459,505, filed on Jul. 24, 2006, now abandoned, which is a division of application No. 10/854,048, filed on May 26, 2004, now Pat. No. 7,094,293.

(30) Foreign Application Priority Data

May 27, 2003 (DE) ................. 103 24 317

(51) Int. Cl.
*A47L 13/02* (2006.01)
(52) U.S. Cl. .............. 15/104.16; 15/104.05; 15/236.01; 15/104.095
(58) Field of Classification Search .............. 15/104.05, 15/104.16, 245, 104.067–104.069, 104.095, 15/236.01; 165/95
See application file for complete search history.

(56) References Cited

U.S. PATENT DOCUMENTS 2,283,768 A 5/1942 Schueler
2,821,641 A 1/1958 Ringland
3,614,497 A 10/1971 Brenner
4,138,758 A 2/1979 Dodge et al.

(Continued)

FOREIGN PATENT DOCUMENTS

CA 2196448 7/1998

(Continued)

OTHER PUBLICATIONS

Unknown Author:"Die wirtschaftliche Entfernung der Nutenisolation aus den Blechpaketen zur Neuwicklung anstehender Elektromaschinen", EMA, vol. 1/2, 1961, pp. 33-34 (including 3 pages of translation).

*Primary Examiner*—Shay L Karls
(74) *Attorney, Agent, or Firm*—Leydig, Voit & Mayer, Ltd.

(57) ABSTRACT

A device for mechanically cleaning a groove used to hold a rotor or a stator winding of an electric machine includes an axially moveable device carrier and at least one cleaning tool connected to the device carrier and extending radially from the device carrier into the groove. In addition, a corresponding method includes the steps of radially moving at least one cleaning tool connected to a device carrier so as to mechanically remove impurities on a wall section of the groove, axial advancing of the device carrier in a manner adapted to the radial movement of the at least one cleaning tool, and setting the dimensional tolerance range for the groove by adjusting the cleaning tool. The device and the method are suitable for cleaning grooves into which a new winding is to be installed in an existing laminated body, for example, in the case of the retrofitting of generators.

7 Claims, 5 Drawing Sheets

U.S. PATENT DOCUMENTS

| | | |
|---|---|---|
| 4,340,989 A | 7/1982 | Rotondi et al. |
| 5,044,612 A | 9/1991 | Kaiser et al. |
| 5,610,754 A | 3/1997 | Gheen et al. |
| 5,782,209 A | 7/1998 | Vandenberg et al. |
| 5,983,994 A | 11/1999 | Tsou |
| 6,209,647 B1 | 4/2001 | Brown, Jr. |
| 6,393,645 B1 | 5/2002 | Kadinger |
| 6,394,112 B1 | 5/2002 | Steinmetz et al. |
| 6,499,173 B2 | 12/2002 | Van Ornum |

FOREIGN PATENT DOCUMENTS

| | | |
|---|---|---|
| DE | 1125067 | 3/1962 |
| WO | WO-2004043638 | 5/2004 |

DEVICE AND METHOD FOR MECHANICAL CLEANING OF GROOVES

This is a Divisional Application of U.S. application Ser. No. 11/459,505, filed on Jul. 24, 2006, which is a divisional of U.S. application Ser. No. 10/854,048 filed May 26, 2004, which claims priority to German Patent Application No. DE 103 24 317.8, filed on May 27, 2003. The entire disclosure of all applications is incorporated by reference herein.

The invention relates to a device and to a method for the mechanical cleaning of grooves which are used to hold rotor or stator windings of an electric machine.

BACKGROUND

When motors and generators having a high quality and a long service life are built, it is a known practice to use an electric insulation system that fulfills the usually wide variety of electric, mechanical and environmental requirements. In this context, in order to vacuum-impregnate and cure the completely wound stator or rotor, a specially modified epoxy resin is used that produces a void-free insulation with sealed surfaces. Particularly in the case of such windings, the stator or rotor spools that have been freed of the old windings first have to be cleaned before they can be fitted with new windings. Up until now, it has been necessary to first remove the epoxy resins that are injected between the stator bar and the laminated core during the impregnation and pressure-compacting process. This work is difficult to carry out, especially with narrow and deep winding grooves, since the resin has to be removed without damaging the laminated core.

Various cleaning devices and methods have already been tried in order to achieve this, but they all entail considerable drawbacks. Thus, for example, according to a known method, a dry-ice cleaning operation is carried out, that is to say, the dry ice causes the epoxy resins adhering to the groove walls to become brittle so that they can be removed manually. All in all, this technique is expensive and uneconomical in very hot or tropical countries.

Another known method proposes cleaning the grooves using a manual belt grinder. This approach entails the risk of damaging the laminated core, in addition to which, with narrow grooves, the problem arises that it is difficult to properly reach everywhere.

Finally, manually scraping or scouring the epoxy resins is also a possibility, but here too, there is a risk of damage to the laminated core, in addition to which the narrow and long grooves are difficult to access. Moreover, these cleaning methods are not conducive to automation and require costly manual processing.

SUMMARY OF THE INVENTION

An aspect of the present invention is to provide a device and a method for cleaning a groove in a laminated body used for holding rotor/stator windings of an electric machine. The device according to the present invention and the method according to the present invention provide a cleaning of the groove in a reliable mechanical manner without damaging the lamination of the rotor/stator. In particular, the devices and the method should be suitable for cleaning a groove into which a new winding is to be installed in the existing laminated body, for example, in the case of the retrofitting of generators.

The present invention provides a device for cleaning a groove used to hold at least one of a rotor winding and a stator winding of an electric machine. The device includes an axially moveable device carrier, and at least one cleaning tool connected to the device carrier and extending radially from the device carrier into the groove.

Using the device according to the invention and the method according to the invention, the groove is cleaned by a kind of fine cutting of the adhesions. Thus, this is not a grinding off or "blasting" procedure of the surface to be cleaned, for example, using dry ice or hazelnut seeds, but rather it is essentially a fine cutting or planing. The cleaning is done automatically. Here, the directional references, axial and radial, relate to the longitudinal axis of the rotor/stator.

The cutting can be carried out by means of an up and down movement that is executed, for instance, with a piston. In this manner, the cleaning tool is moved in the radial direction relative to the stator or rotor so that the lamination is not damaged. With this cleaning process, also referred to as planing, the cleaning tool makes a pushing and pulling movement along the groove at the same time.

An advantageous embodiment of the present invention proposes that there are two or more cleaning tools for the parallel cleaning of a groove wall. These tools can be hydraulically powered, for example, by an appropriate number of lifting cylinders.

In an alternative embodiment, there are two or more cleaning tools for the parallel cleaning of groove walls that lie across from each other. In this manner, for example, a groove can be completely freed of resin residues in one cleaning step.

In a preferred embodiment of the device according to the invention, a mobile unit, the device carrier, moves on guide device in the axial direction over the entire length of the groove. The guide device is attached to the inner circumference when they are used on a stator, whereas they are attached to the outer circumference when they are used on a rotor. The guide device can advantageously be configured as a pair of rails or else, for instance, as a monorail. Depending on the type of drive, it is also possible to provide teeth on the guide device, somewhat like a cogwheel railway.

In an especially advantageous embodiment of the device according to the invention, there is a setting device for setting and adjusting the stroke and the cutting depth as well as the groove width of the at least one cleaning tool. The cutting depth of the cleaning tool can be adjusted in such a way that it can be adapted to the specifics of the cleaning device and of the groove. This prevents the insulation section between the laminated strips from being damaged. Moreover, this determines the dimensions of the shavings and thus the cutting speed.

In another advantageous refinement of the device according to the invention, there is a setting device for setting the rate of advancing as a function of the stroke or rotation of the at least one cleaning tool. This is necessary in order to adapt the axial and radial movements to each other and to thus achieve a good cleaning result. The setting can be effectuated in that, for example, with a stepper drive, the number of radial strokes is prescribed before any axial advance is made.

In addition, the present invention provides a method for mechanically cleaning a groove used to hold at least one of a rotor winding and a stator winding of an electric machine. The method includes the steps of radially moving at least one cleaning tool connected to a device carrier so as to mechanically remove impurities on a wall section of the groove; axially advancing the device carrier with respect to the groove, wherein the axial advancing is adapted to the radial moving of the at least one cleaning tool; and adjusting the at least one cleaning tool so as to set a dimensional tolerance range for the groove. Here, the cleaning method is carried out automatically once the device has been set up and configured.

Advantageously, the axial movement is guided by a guide device such as, for example, rails. The advancing is effectuated here, for example, by a pneumatically controlled chain drive and sprocket wheel drive, by an electric motor via a cogwheel drive or by a rope drive.

In an advantageous embodiment of the method according to the invention, the advancing movement takes place step-by-step, whereby at least one stroke movement of the cleaning tool, preferably several strokes, are made in the radial direction for each step. In this manner, a complete and reliable cleaning is ensured.

BRIEF DESCRIPTION OF THE DRAWINGS

Below, an advantageous embodiment of the invention is described in conjunction with the appended drawings, in which.

DETAILED DESCRIPTION

Figure 1:
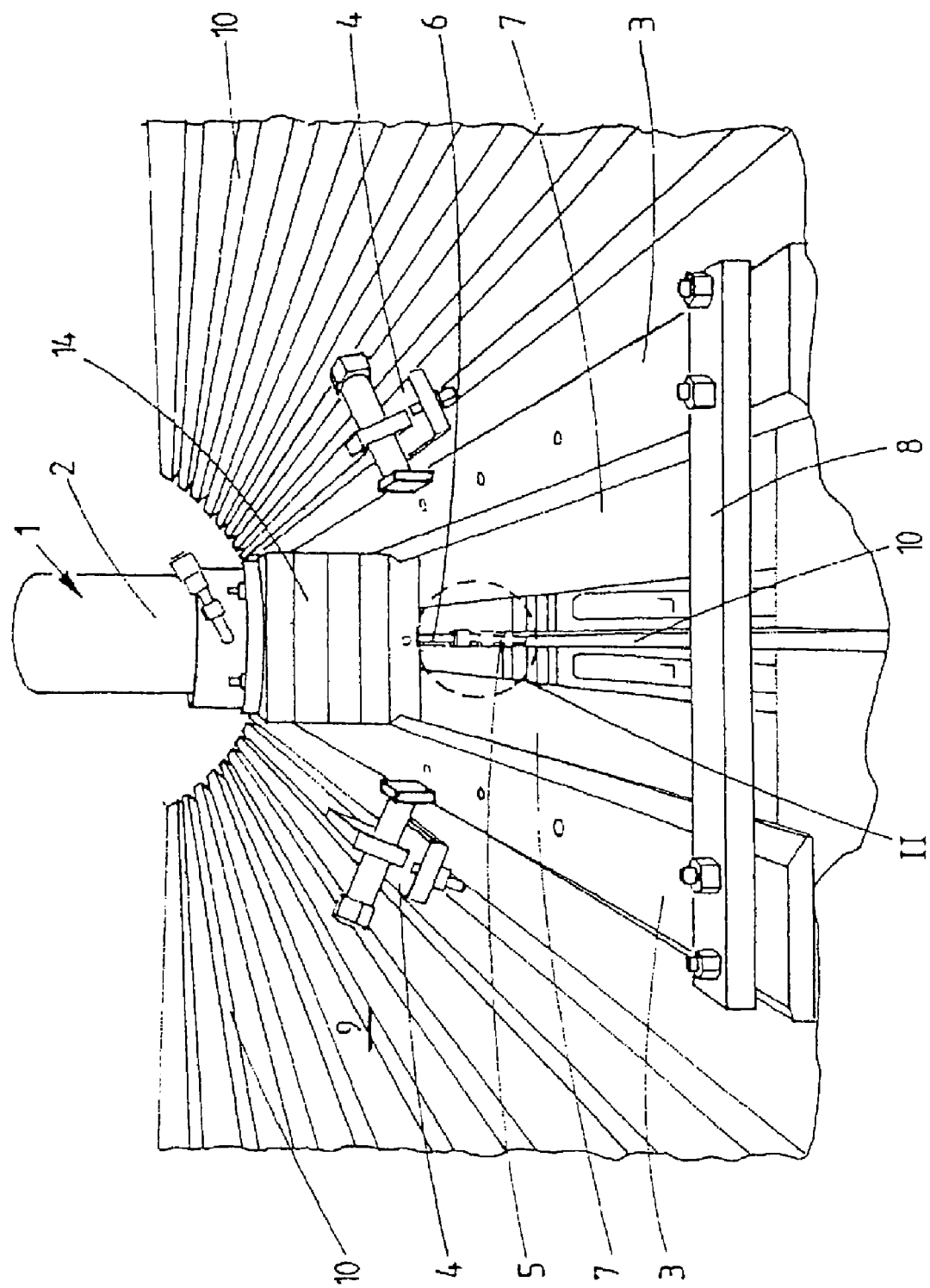
FIG. 1 shows a perspective view of a first embodiment of a groove cleaning device according to the invention.

The drawings show only elements that are essential for understanding the invention. In the following description, the same or similar parts are designated with the same reference numerals. The directional indications—axial and radial—relate to the longitudinal axis of the stator.

FIG. 1 shows a perspective view of a first embodiment of a groove cleaning device 1 according to the invention. It is installed in the inner radius of an exposed stator lamination 9 of an electric generator. Here, relative to the center line of the stator, there are two guide devices configured as axial guide rails 3 that are arranged parallel to each other. The guide rails 3 are attached to the stator lamination 9 by means of supports 4 and affixed by crossbars 8 arranged on the front and back ends.

A device carrier 14 is guided by the guide rails 3 and said device carrier 14 rests on sliding plates 7 that are connected to the guide rails 3. The device carrier 14 is attached in the middle above the stator groove 10 that is to be worked and from which the winding has already been removed. An actuation piston 2 is positioned on the device carrier 14.

The actuation piston 2 serves to effectuate the up and down movement of the piston rod 6 at whose lower end a cleaning tool 5 is arranged.

Figure 2:
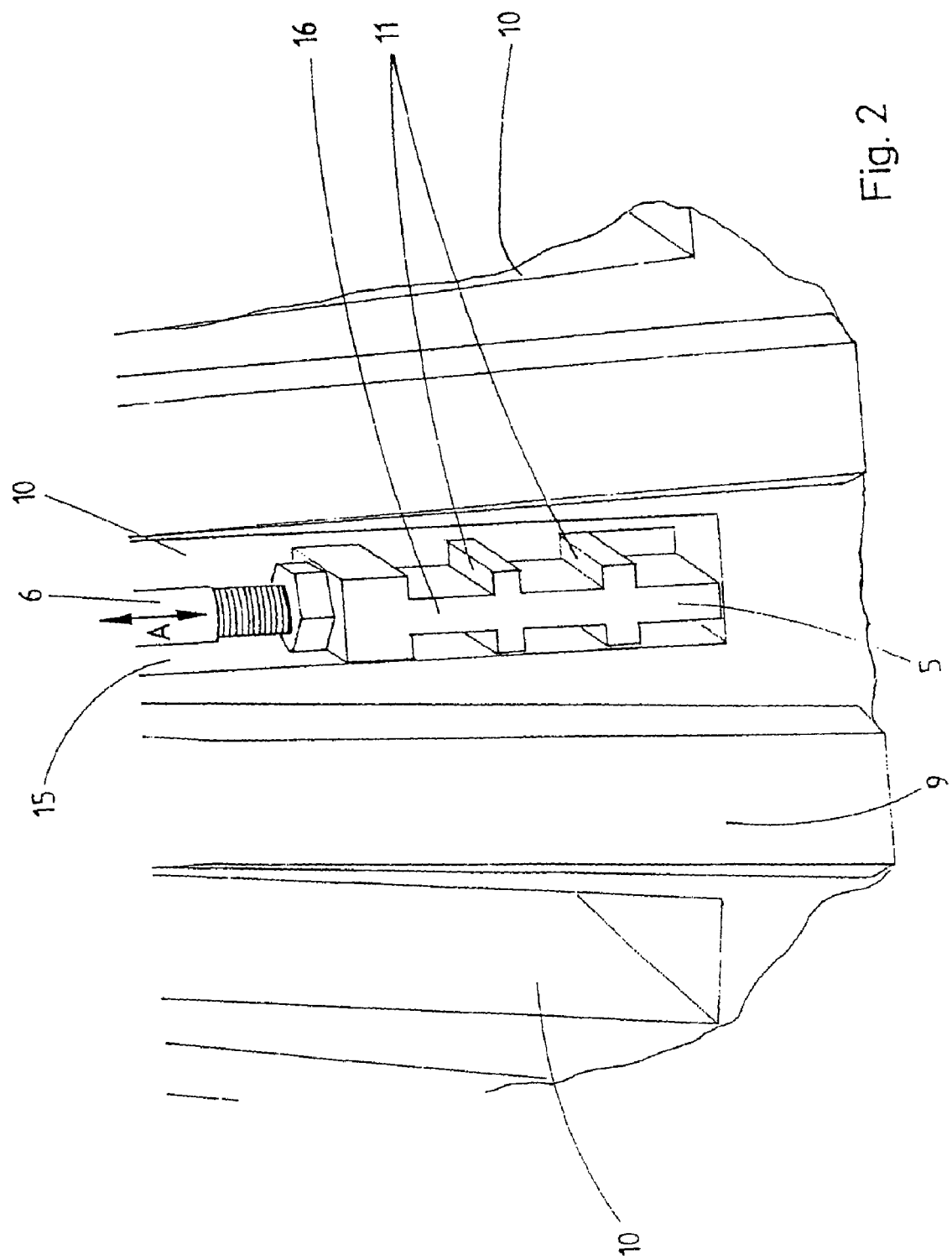
FIG. 2 shows the schematic detailed view of area II from FIG. 1 of a cleaning tool according to the invention.

FIG. 2 shows a schematic detailed enlargement of area II and of the cleaning tool 5 from FIG. 1. In addition to the piston rod 6, the horizontal cutting surfaces 11 of the cleaning tool 5 are also shown here, extending to the left and to the right of the tool body 16.

In order to clean the stator groove 10, the rate of advance of the groove cleaning device 1 is set as a function of the stroke rate of the cleaning tool 5, that is to say, the axial movement of the device carrier 14 is defined in such a way that the piston rod 6 executes at least one full stroke, preferably several strokes, on one groove wall section before it is moved to the next groove wall section. The cleaning tool 5 is adjusted in such a way in the stator groove 10 that the cleaning tool 5 is shifted horizontally so that the cutting surfaces 11 lie against a groove wall 15, as a result of which the dimensional tolerance range for the groove is set at the same time.

During operation, the stator groove 10 is cleaned by a kind of fine cutting or planing of the adhesions by the cleaning tool 5. At the same time, a pushing and pulling movement of the cleaning tool 5 is made along the stator groove 10 in the axial direction. The stroke of the cleaning tool 5 is made here in the arrow direction A. Moreover, the mobile device carrier 14 moves in the axial direction on the guide rails 3. The resin residues are thus gently removed on one side of the stator groove. The removed resin residues fall through the ventilation slits and are blown away. At the end of this cleaning section, the cleaning tool 5 is readjusted so that it comes to lie on the groove wall 15 that has not been cleaned yet and the groove cleaning procedure, as already described above, is carried out again for the second groove wall 15. The groove cleaning device 1 is set or adjusted from outside of the stator by means of a pneumatic control.

Figure 3:
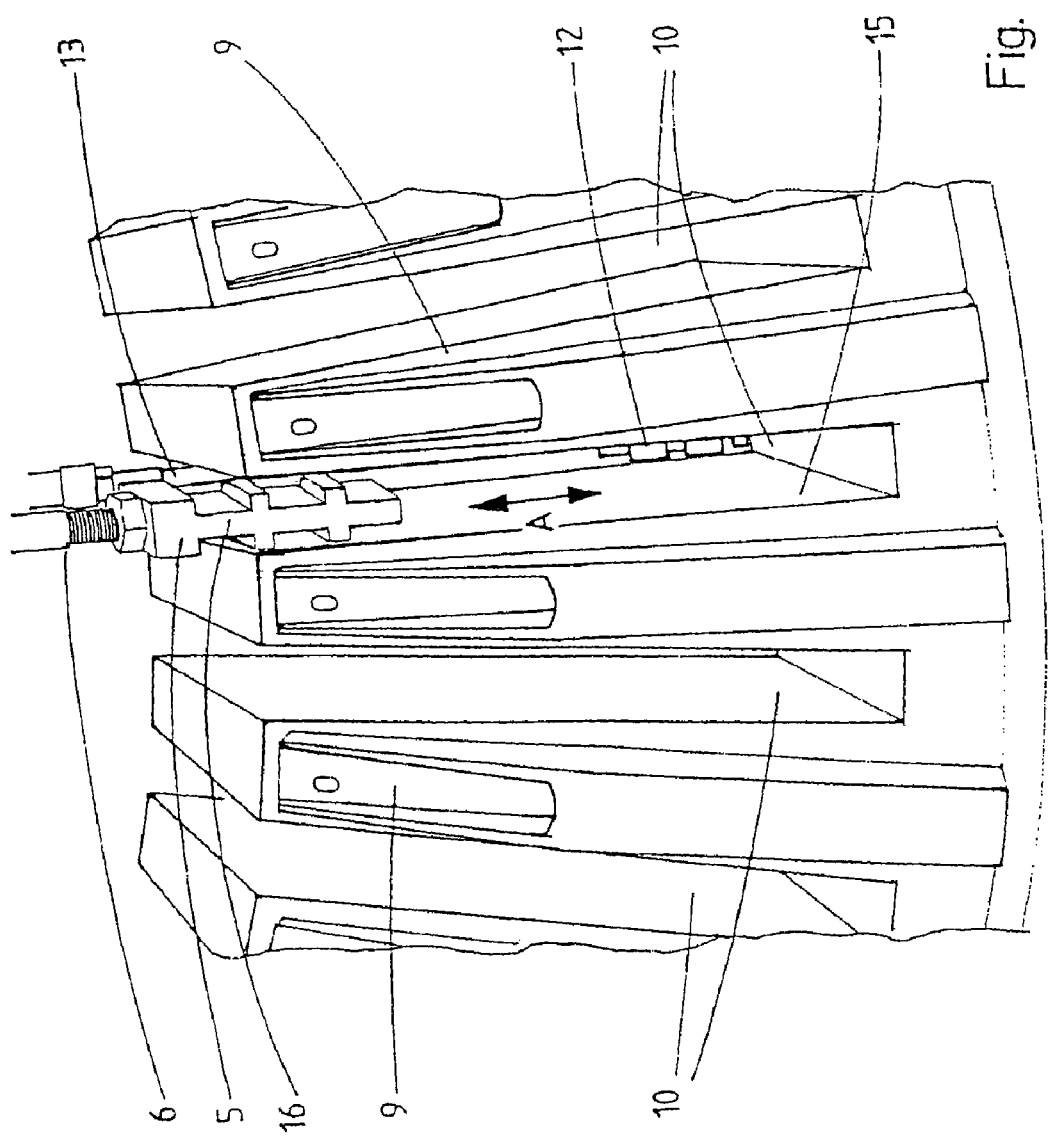
FIG. 3 shows a schematic detailed view of a second embodiment of a second groove cleaning device according to the invention, with two cleaning tools.

FIG. 3 shows a schematic detailed view of a second embodiment of a groove cleaning device according to the invention, with a first groove cleaning tool 5 and a second groove cleaning tool 12. The two groove cleaning tools 5, 12 are arranged behind one another in the axial direction.

Due to the arrangement of the groove cleaning tools 5, 12 behind one another, two sections of a groove wall 15 can be cleaned in parallel, as a result of which the steps of the step-by-step advancing movement in the present embodiment can be selected to have a larger value. As an alternative, however, the second groove cleaning tool 12 can also be adjusted in such a way that, at the same time, both groove walls 15 of a stator groove 10 are planed off during one cleaning procedure.

Here, first of all, the groove cleaning tools 5, 12 move up and down in the radial direction due to the lifting movement of the first piston rod 6 and of the second piston rod 13 in the arrow direction A and, with their cutting surfaces 11, they plane the epoxy resin residues off the groove wall 15 of the stator groove 10. Secondly, the first groove cleaning tool 5 and the second groove cleaning tool 12 move in the axial direction over the entire length of the stator groove 10 since the device carrier (not shown in FIG. 3) moves in the axial direction with the actuation piston along the groove length.

Figure 4:
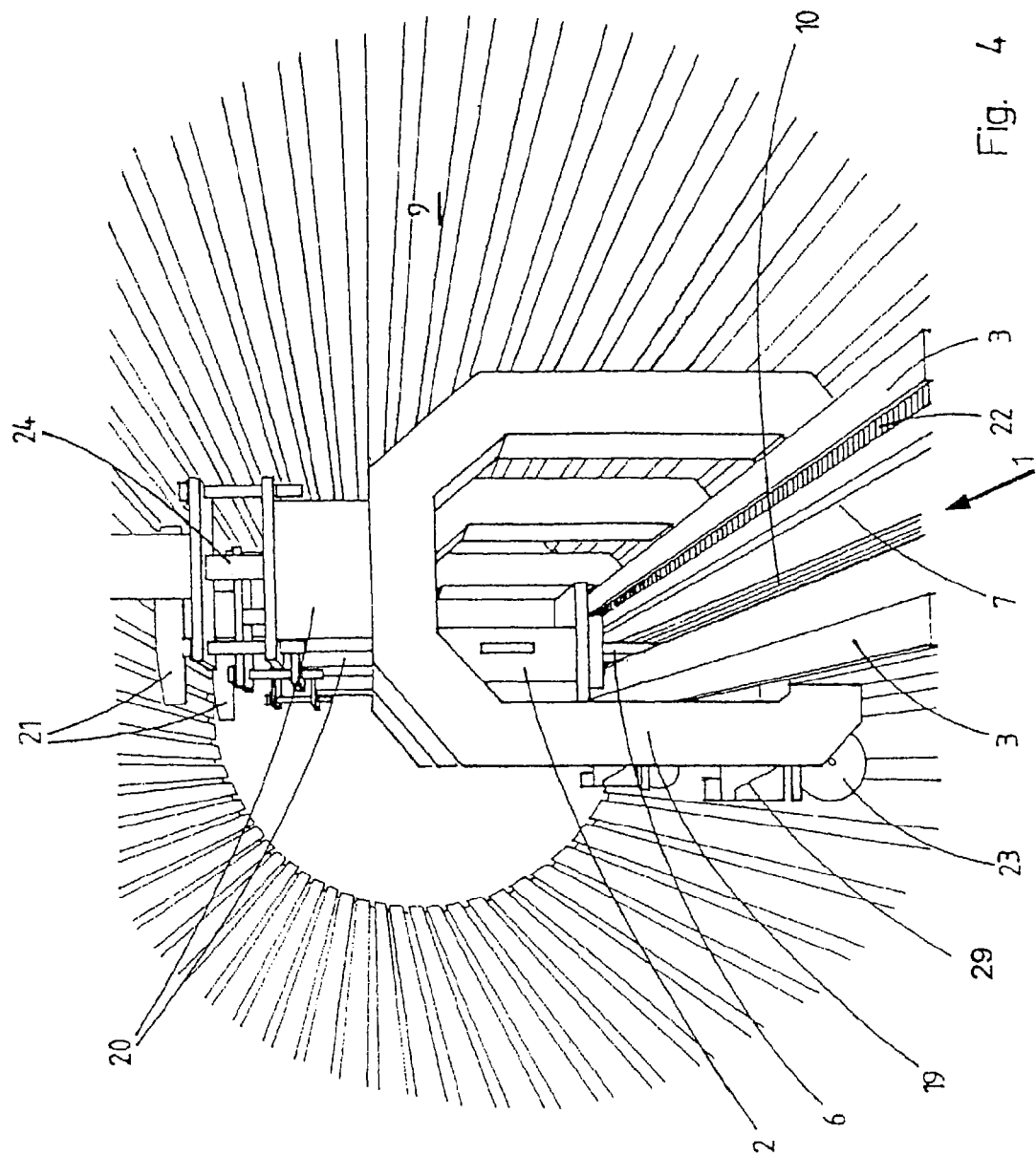
FIG. 4 shows a perspective view of a second embodiment of a groove cleaning device according to the invention.

FIG. 4 shows a perspective view of a second alternative embodiment of a groove cleaning device 1 according to the invention that is installed inside a stator, surrounded by the stator lamination 9. Here, the axial guide rails 3 of the groove cleaning device 1 inside the stator are aligned parallel to the longitudinal axis of the stator and the actuation piston 2 is arranged on a sliding plate 7 in such a way that it can be moved axially along a stator groove 10. In contrast to the above-described embodiment, in the present case, the stability of the axial guide rails 3 is ensured by several U-profile frames 19 arranged behind one another which, at their open U-ends, support the axial guide rails 3 and, at their closed upper ends, each have cylinders 20 with piston rods 24 that serve to press support elements 21 against the upper inner wall of the stator. In this manner, maximum stability and firmness of the device are achieved during the cleaning procedure, and consequently maximum precision.

The actuation piston 2 is moved in the axial direction on the sliding plate 7 by means of a chain 22, whereby the groove cleaning device 1 is pneumatically controlled.

In order to more easily maneuver the U-profile frames 19 in the stator lamination 9, there are rollers 23 on the open ends of the U-shaped legs. The U-profile frames 19 are fastened to the lamination 9 by means of supports 29.

During the operation, the actuation piston 2 is moved axially over the entire groove length of the stator by means of the chain 22, whereby the cleaning tool (not shown here) makes a radial lifting movement on the piston rod 6, thereby "planing off" excess resin deposits.

Figure 5:
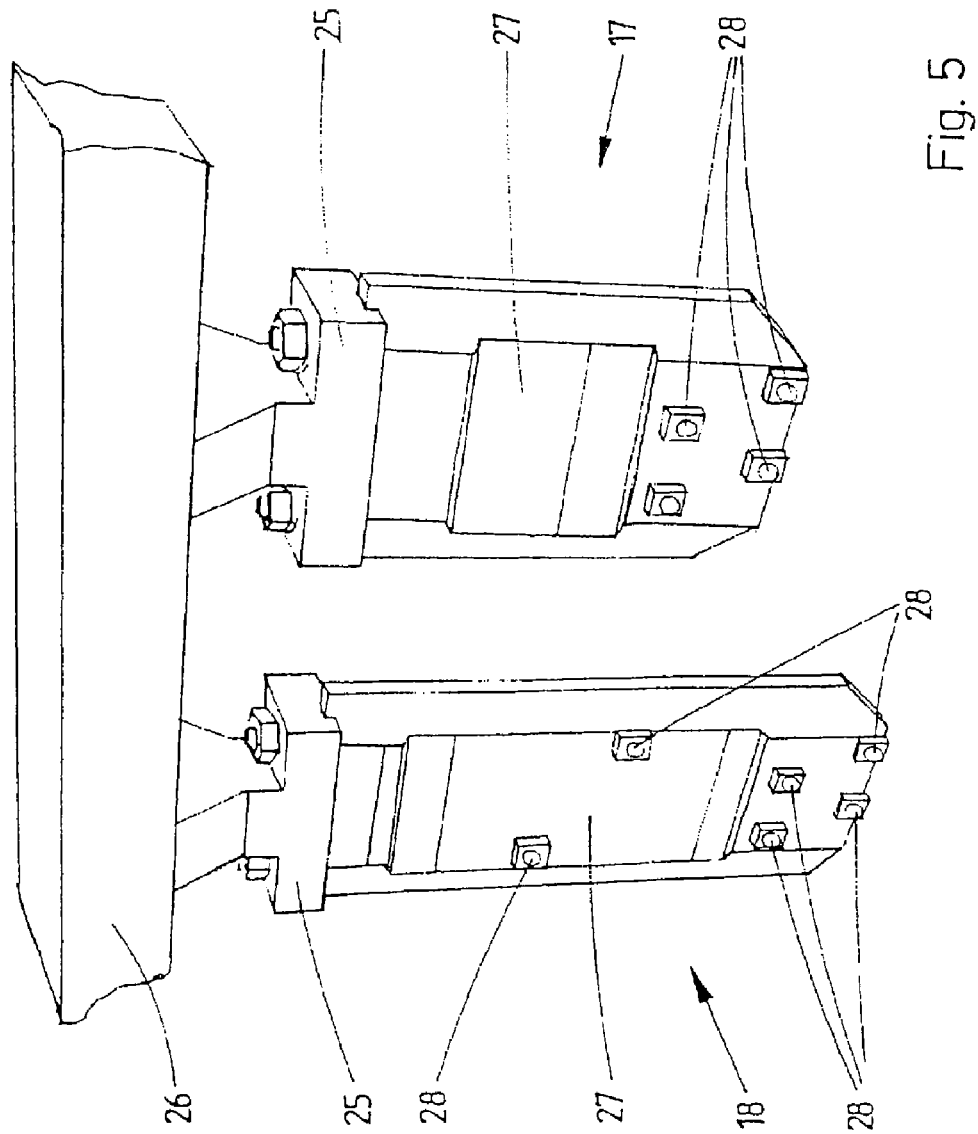
FIG. 5 shows a perspective view of a second embodiment of two cleaning tools arranged behind one another.

FIG. 5 shows a perspective view of a second embodiment of two cleaning tools arranged behind one another, a first cleaning tool 17 and a second cleaning tool 18. The cleaning tools 17, 18 are connected by holding shoes 25 to a tool carrier 26.

The cleaning tools 17, 18 each consist of elongated metal plates that, in the axial direction relative to the longitudinal axis of the stator, are slightly tapered at their front and back ends and that are likewise slightly slanted in the radial direction at their lower end. At their upper end in the radial direction, the cleaning tools 17, 18 are each clamped in an elongated groove of a holding shoe 25.

The essentially flat processing surfaces 27 serve here as carriers for cutting elements 28 of the type that are commonly employed as blades for lathe chisels, milling heads, etc. The essentially rectangular cutting elements 28 are inserted into specially provided depressions on the processing surfaces 27 and screwed in place there. Thanks to a corresponding geometric arrangement of the cutting elements 28, a complete surface covering of the groove surface as well as a residue-free removal of resin residues are ensured. In the process, the resin residues fall through the ventilation slits of the stator and are blown out at the end of the cleaning procedure. The cleaning tools shown in the present embodiment have a length of about 15 cm. The length here is adapted to the corresponding groove depth.

For an application involving the rotors, the groove cleaning device may be attached to the outer circumference of the rotor.

What is claimed is:

1. A device comprising:
    an electrical machine part including at least one of a rotor and a stator and defining a longitudinal axis;
    a plurality of grooves disposed in the electrical machine part and distributed radially about the longitudinal axis, so that a length of each groove runs parallel to the longitudinal axis and a depth of each groove runs in a radial direction relative to the longitudinal axis;
    a device carrier moveable parallel to the longitudinal axis and disposed outside of the plurality of grooves; and
    at least one cleaning tool moveable relative to the device carrier in the radial direction relative to the longitudinal axis, and extending into a groove of the plurality of grooves, wherein the at least one cleaning tool includes a cutting surface lying against a groove wall of the groove and configured to remain in contact with the groove wall during a radial movement of the at least one cleaning tool so as to plane off a residue from the groove wall.

2. The device as recited in claim 1, further comprising a lifting cylinder configured to move the at least one cleaning tool up and down relative to the depth of the groove and in the radial direction relative to the longitudinal axis.

3. The device as recited in claim 1, wherein the at least one cleaning tool includes a plurality of cleaning tools configured to clean the wall section of the groove at the same time.

4. The device as recited in claim 1, wherein the at least one cleaning tool includes a plurality of cleaning tools configured to clean a first and a second wall of the groove at the same time, wherein the first and second walls are disposed across from each other.

5. The device as recited in claim 1, further comprising a guide device disposed axially with respect to the length of the groove, the device carrier being slideable with respect to the guide device in the axial direction.

6. The device as recited in claim 5, wherein the guide device includes at least one rail.

7. The device as recited in claim 1, further comprising a setting device configured to set a rate of advance of the at least one cleaning tool in the axial direction as a function of a stroke of the at least one cleaning tool in the radial direction.

* * * * *